UNITED STATES PATENT OFFICE.

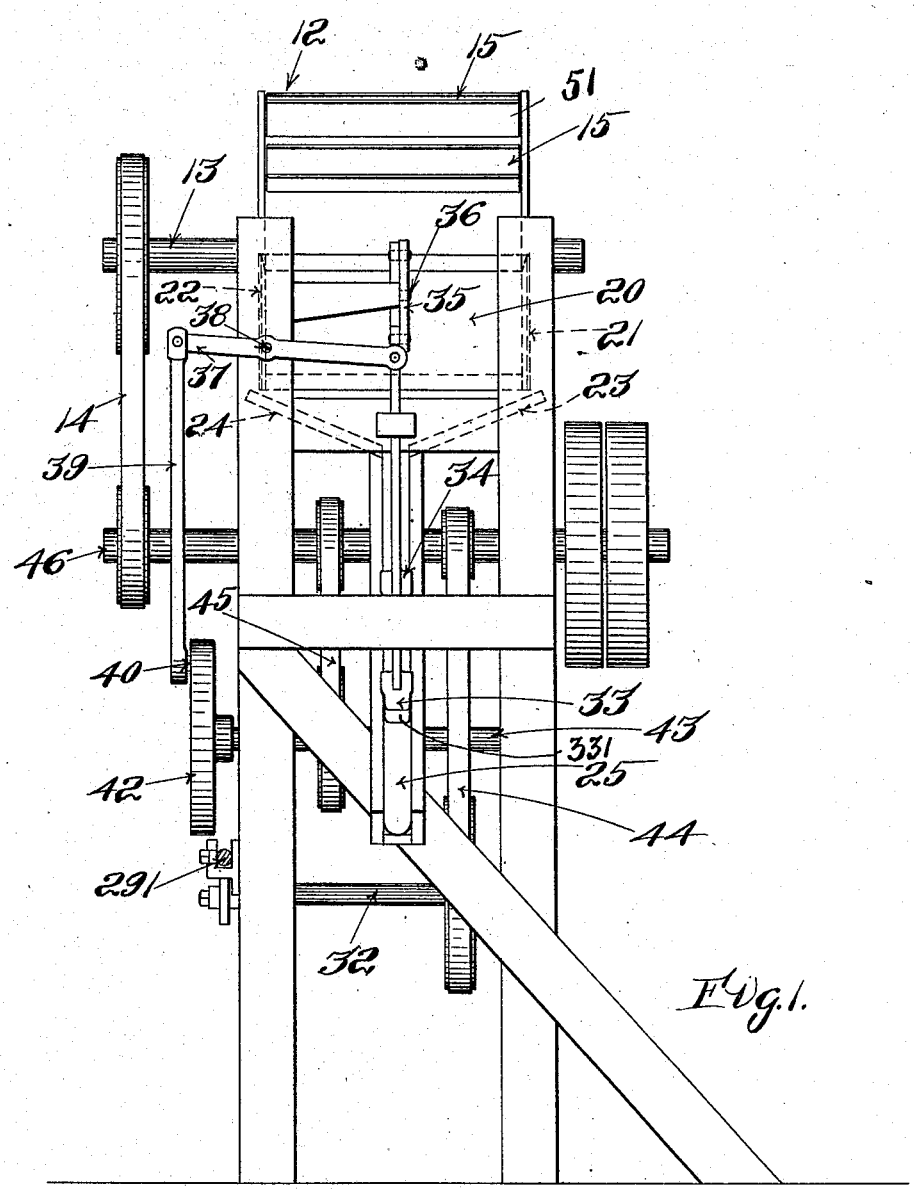

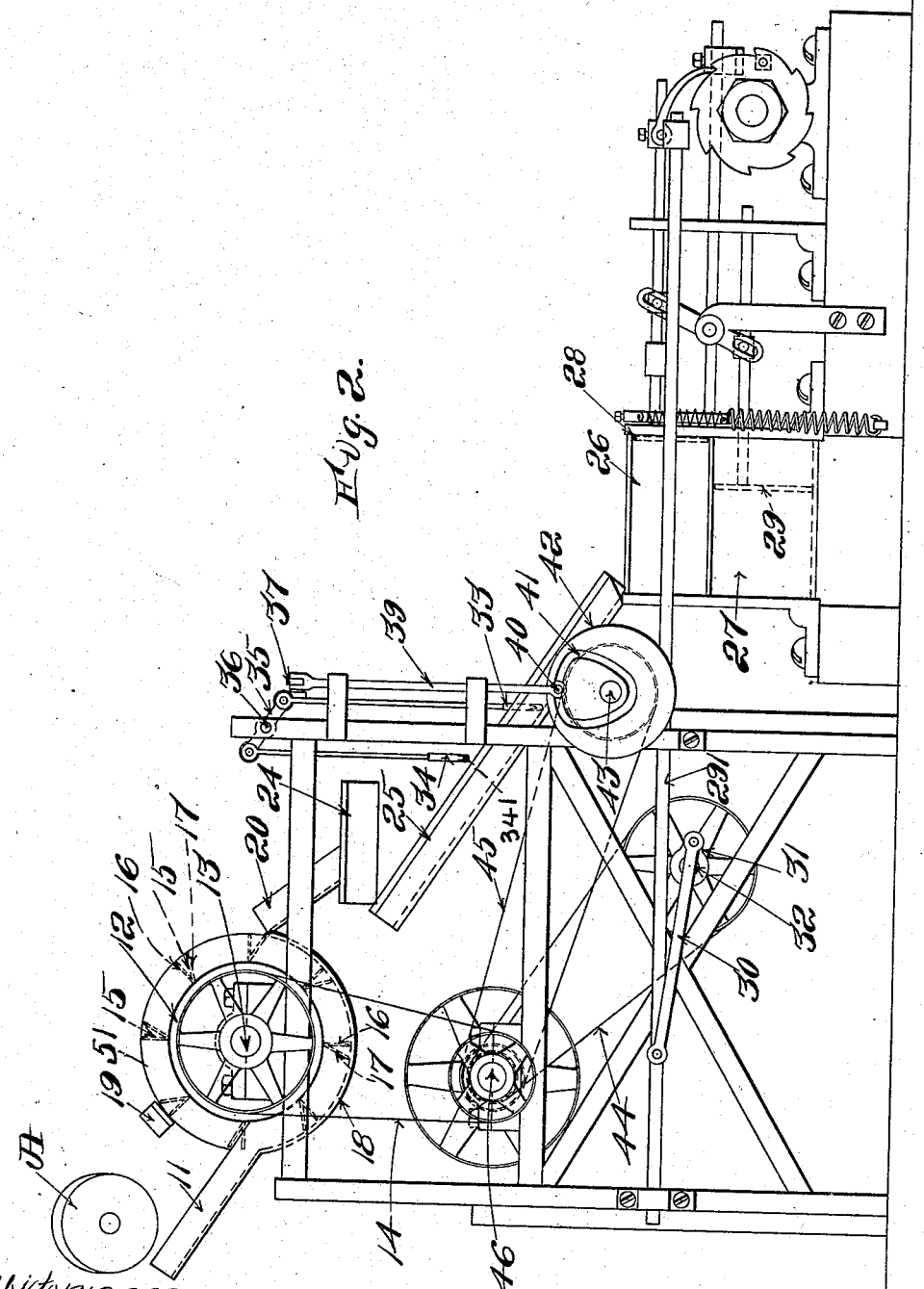

CHARLES C. FREEMAN, OF DIXFIELD, MAINE.

MACHINE FOR BOXING TOOTHPICKS.

No. 911,227.  Specification of Letters Patent.  Patented Feb. 2, 1909.

Application filed November 1, 1907. Serial No. 400,297.

*To all whom it may concern:*

Be it known that I, CHARLES C. FREEMAN, a citizen of the United States, residing at Dixfield, county of Oxford, State of Maine, have invented a certain new and useful Improvement in Machines for Boxing Toothpicks, of which the following is a specification, reference being had therein to the accompanying drawings.
In my Patent No. 882,879, dated March 24, 1908, I have shown and described a machine for boxing tooth picks.

My present invention has for its object certain improvements on the machine shown in that application and embodies certain parts of the machine therein shown.

For the sake of the more satisfactory illustration of the invention, I have included in the drawings and descriptions of the present invention those parts just referred to, but have not thought it necessary to describe them with the same fullness with which they are described in the application above referred to.
The present invention has been designed with the object of insuring that the picks shall arrive at the part of the machine known as the evening mechanism in a perfectly parallel position so that none of the tooth picks shall lie crosswise of the hopper or first receptacle of the evening device.

The invention will be fully understood from the following description taken in connection with the accompanying drawings, and the novel features thereof will be pointed out and clearly defined in the claims at the close of the specification.

In the drawings,—Figure 1 is a front elevation of the machine embodying my invention. Fig. 2 is a side elevation thereof, certain parts, by means of which the members of the device are supported, being omitted for clearness of illustration.

Referring to the drawings,—A represents a tumbling barrel or hustler from which the finished picks are delivered to the boxing machine. The said picks fall from the tumbling barrel into a trough 11 down which they slide to a wheel-conveyer 12 mounted on the shaft 13 and driven by a belt 14. The wheel-conveyer 12 is provided with narrow V-shaped buckets 15 alternating with wide buckets 51. It is found in practice that when the buckets of the wheel-conveyer are all narrow buckets, such for instance as the buckets 15, that the feed is somewhat retarded. On the other hand, if the buckets are all wide, such for instance as 51, that in the discharge of the picks from the wheel-conveyer to the delivery chute, such as 20, the large loads follow each other so closely that there is not sufficient time given for one large load to get out of the way before another large load is dumped onto it, and, therefore, the mechanism for evening up the picks in the subsequent operations cannot so efficiently perform its work. I find in practice, therefore, that the most efficient way, taking into consideration the problem of handling a large number of tooth picks and at the same time delivering them evenly to the box, is to alternate the narrow buckets with the wide buckets.

The narrow buckets 15 are preferably composed of two walls, the rear one of which, 16, is radially disposed with relation to the wheel, and the other of which, 17, is eccentrically disposed, the edges nearer the center meeting together to form a somewhat V-shaped trough or bucket.

It is found in practice that if the picks are fed into the buckets, especially into the larger buckets 51, at a point at or below the center of rotation of the conveyer, so that they will fall down to meet the uprising wall of the bucket, they will pack in better form in the bucket than if they are delivered to the bucket at a point above the center. In order, however, to enable this to be done and to prevent the picks from falling out of the bucket during the upward travel, it is necessary to have the outer periphery of the conveyer housed on the under side. I have, therefore, provided a housing 18 for the under side of the conveyer extending downwardly from the lower end of the chute or trough 11 and preferably carried around the under side up to meet the discharge chute 20 on the opposite side from the feed chute 11. This housing serves to retain the picks within the buckets during the time that the buckets are upside down.

Preferably there is a doctor 19 provided which serves to brush off any surplus picks from the buckets or those whose ends happen to project beyond the periphery of the conveyer. The wheel-conveyer 12 is preferably of a greater axial length than the lengths of the picks which are to be boxed; that is, the length of each bucket 15 and 51 measured in a line parallel with the axis of rotation is considerably greater than the length of the picks. This enables a much larger quantity of picks to be carried by the conveyer than if the length of the buckets were only as great or slightly greater than the length of the picks.

The picks are carried by the rotation of the conveyer around to the chute 20 into which they are discharged from the open outer ends of the buckets. By reason of the narrow buckets alternating with the wide buckets, after a discharge from one of the larger buckets into the chute 20, the next discharge will be from one of the smaller buckets 15, the walls of which will hold back the contents of the next approaching large bucket 51, thus giving opportunity for the already discharged load of the first large bucket 51 to pass down out of the way.

The chute 20 is provided with inclined walls 21 and 22 and from the lower end of the chute 20 they fall onto two boards 23 and 24 which are downwardly inclined and converge towards each other at their lower end, the lower edges of which are separated from each other as shown in Fig. 1, by a space preferably less than the width of the round bottom chute 25 into which the picks pass through the opening between the lower edges of the said boards 23 and 24.

I find that by the use of the train of elements heretofore described and comprising the wheel-conveyer, chutes and inclined boards, the picks are deposited in the round bottom chute 25 in a substantially parallel condition and at a rate which is substantially uniform irrespective of the condition of the picks when delivered from the tumbler or hustler or the speed with which they are delivered.

The lower end of the round bottom chute 25 delivers the picks into the upper receptacle 26 of the evening mechanism from which they fall into the lower receptacle 27. The said lower receptacle 27 is constructed to open and deposit its contents in a box which is placed beneath it. The picks, while in the upper receptacle 26 and lower receptacle 27, are acted upon by plungers 28 and 29 at proper intervals and by this means the picks in the said receptacles are caused to lie with their ends even with each other. These plungers are operated by the shaft 291 which is caused to reciprocate longitudinally by the connecting rod 30 which is attached to a crank 31 on a shaft 32.

In order that the picks in the upper evening receptacle 26 may lie horizontally and not obliquely as would be the case if the stream of picks, which pours out of the bottom of the round bottom chute 25, were continuous, I provide a pair of gates 33 and 34 which operate alternately to close the chute 25 and prevent temporarily the passage of picks to the upper evening receptacle. These two gates 33 and 34 are located at some convenient distance apart and are both connected at their upper ends to a walking beam 35 pivoted at 36 to the frame. One end of the walking beam 35 is connected to a lever 37 also pivoted to the frame at 38 and the other end of the said lever 37 is moved up and down by a cam rod 39 upon the lower end of which is a cam follower 40. The said cam follower 40 runs in a cam groove 41 cut in the surface of a plate cam 42 mounted in the end of the shaft 43. The said shafts 13, 32 and 43 are driven by belts 14, 44 and 45 from pulleys on the main driving shaft 46. The said gates 33 and 34 are thereby given motion at stated intervals with relation to the opening and closing of the upper evening receptacle 26 so that no picks are passing into the said evening receptacle during the time when it is opening and closing.

The lower ends of the gates 33 and 34 are preferably provided with rubber shoes 331 and 341, respectively. It is not necessary, in order to stop the flow of the picks, for the gates in their descent to pass entirely through the mass of picks to the bottom of the chute 25, but the impinging of the lower ends of the gate upon the mass of picks will be sufficient to stop the flow. The rubber shoes on the lower ends of the gates enable this to be done without injury to the picks. It will thus be seen that the upper gate 34 holds back the picks in the round bottom chute 25 while the picks which were between the two gates 33 and 34 are sliding into the evening receptacle. Thereafter when the lower gate is down and the upper gate is raised, the picks in the trough are allowed to slide down against the lower gate preparatory to being discharged into the upper evening receptacle 26.

I claim as my invention:

1. In a machine for boxing tooth picks and the like, a rotary wheel-conveyer provided with a continuous series of buckets upon its periphery, some of said buckets being relatively narrow and the others being of considerably greater width than said narrower ones, the narrower buckets and the wider buckets alternating with each other.

2. In a machine for boxing tooth picks and the like, a rotary wheel-conveyer provided with a continuous series of buckets upon its periphery, some of said buckets being V-shaped transversely of the axis of rotation, and the other buckets being of considerably greater width both at the top and the bottom than said V-shaped buckets, said V-shaped buckets and said wide buckets alternating with each other.

3. In a machine for boxing tooth picks and the like, a rotary wheel-conveyer provided with a continuous series of buckets upon its periphery, some of said buckets being V-shaped transversely of the axis of rotation, and the other buckets being of considerably greater width both at the top and the bottom than said V-shaped buckets, said V-shaped buckets and said wide buckets alternating with each other, a feed chute which supplies tooth picks to the uprising buckets below the axis of rotation, a discharge chute to which the picks are delivered from the buckets in their descent and a housing on the under side of the wheel-conveyer extending from the feed chute to the discharge chute.

4. In a machine for boxing tooth picks and the like, a rotary wheel-conveyer provided with a continuous series of buckets upon its periphery, some of said buckets being V-shaped transversely of the axis of rotation, and the other buckets being of considerably greater width both at the top and the bottom than said V-shaped buckets, said V-shaped buckets and said wide buckets alternating with each other, a feed chute which supplies picks to the buckets while they are rising during the rotation, a discharge chute to which the picks are delivered from the buckets during their descent in the rotation, a pair of inclined guide boards onto which the picks are discharged from said discharge chute, said guide boards being inclined downwardly towards each other, their bottom edges being separated by a narrow space and an inclined trough into which the picks fall through the narrow space between said boards.

5. In a machine for boxing tooth picks and the like, a rotary wheel-conveyer provided with a continuous series of buckets upon its periphery, some of said buckets being V-shaped transversely of the axis of rotation, and the other buckets being of considerably greater width both at the top and the bottom than said V-shaped buckets, said V-shaped buckets and said wide buckets alternating with each other, a feed chute which supplies picks to the buckets while they are rising during the rotation, a discharge chute to which the picks are delivered from the buckets during their descent in the rotation, a pair of inclined guide boards onto which the picks are discharged from said discharge chute, said guide boards being inclined downwardly towards each other, their bottom edges being separated by a narrow space, an inclined trough into which the picks fall through the narrow space between said boards, an evening device into which the picks are discharged from said last mentioned inclined trough, and a pair of gates which alternately engage the mass of picks in said last mentioned chute at different points in the chute, one of said gates being open when the other is closed whereby when the first gate is closed, the mass of picks below it may be discharged, and when the first gate rises and the second gate is closed the stream of picks may flow until it is engaged by the second gate, and when the second gate again rises and the first one closes another load of picks may be discharged.

6. In a machine for boxing tooth picks, an inclined trough chute, mechanism for delivering picks into the upper part of the chute, a receptacle into which the picks are discharged from the lower end of the chute, a pair of vertically reciprocable gates above the said chute spaced apart from each other and adapted to move down upon the mass of picks in the chute alternately and at different points from each other, means for vertically reciprocating said gates in opposite directions whereby when one gate is up the other is down, and vice versa, and whereby when the gate which engages the mass at the higher elevation is closed the mass of picks below it may be discharged, and when the lowermost gate is closed the stream of picks may flow until it is engaged by the lowermost gate, and when the said lowermost gate again rises and the uppermost gate closes the intermediate mass of the picks between the gates may be discharged.

In testimony whereof I affix my signature, in presence of two witnesses.

CHARLES C. FREEMAN.

Witnesses:
GUY A. DIKE,
ALICE H. MORRISON.